(12) United States Patent
Salomone et al.

(10) Patent No.: US 8,346,247 B2
(45) Date of Patent: *Jan. 1, 2013

(54) SOLICITING FIRST PARTY IN COMMUNICATION SESSION TO MAINTAIN CALL WHEN DEGRADATION OF CONNECTION TO SECOND PARTY IS ANTICIPATED

(75) Inventors: Leonardo Salomone, Nepean (CA); Rudy Eugene Rawlins, Scarborough (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,282

(22) Filed: Jul. 25, 2012

(65) Prior Publication Data

US 2012/0287811 A1  Nov. 15, 2012

Related U.S. Application Data

(63) Continuation of application No. 11/687,139, filed on Mar. 16, 2007, now Pat. No. 8,238,899.

(51) Int. Cl.
*H04W 24/00* (2009.01)

(52) U.S. Cl. ......... 455/425; 455/466; 455/436; 370/331

(58) Field of Classification Search .......... 455/436–444, 455/466; 370/328–338
See application file for complete search history.

(56) References Cited

U.S. PATENT DOCUMENTS

| | | | |
|---|---|---|---|
| 6,408,184 B1 | 6/2002 | Kallio et al. | |
| 6,507,567 B1 | 1/2003 | Willars | |
| 7,076,245 B1 * | 7/2006 | Satapathy | 455/421 |
| 7,889,854 B2 * | 2/2011 | Kouchri et al. | 379/211.01 |
| 2002/0090947 A1 | 7/2002 | Brooks et al. | |
| 2003/0037146 A1 | 2/2003 | O'Neill | |
| 2004/0047290 A1 | 3/2004 | Komandur et al. | |
| 2004/0203424 A1 * | 10/2004 | Akhteruzzaman et al. | 455/67.11 |
| 2006/0109786 A1 | 5/2006 | Abdel-Kader et al. | |
| 2007/0064654 A1 | 3/2007 | Heller | |

FOREIGN PATENT DOCUMENTS

| | | |
|---|---|---|
| EP | 1471762 | 10/2004 |
| EP | 1480427 | 11/2004 |
| EP | 1631033 | 3/2006 |

OTHER PUBLICATIONS

Goedhart, Andre, Exam Report for EP 07104363.2, Oct. 31, 2008.
Goedhart, Andre, Fourth Exam Report for EP07104363.2, Nov. 15, 2010.

(Continued)

*Primary Examiner* — Anthony Addy
*Assistant Examiner* — Quan M Hua
(74) *Attorney, Agent, or Firm* — Integral Intellectual Property Inc.; Miriam Paton

(57) ABSTRACT

A system and method are provided for monitoring the quality of a communication session with a mobile device. Should the communication session degrade, rather than dropping the communication session the user of a device communicating with the mobile device is prompted to wait while an attempt is made to improve the quality of the communication session. Similarly if the user of the mobile device moves out of a coverage area, rather than dropping the communication session the user of the device communicating with the mobile device is prompted to wait until a new communication session can be established.

12 Claims, 5 Drawing Sheets

OTHER PUBLICATIONS

Goedhart, Andre, Third Exam Report for EP 07104363.2, Dec. 3, 2009.

Goedhart, Andre, Extended European Search Report for EP 07104363.2, Aug. 20, 2007.

Scott, Anne-Marie, First Office Action for CA 2,624,738, Feb. 16, 2010.

Scott, Anne-Marie, Second Office Action for CA 2,624,738, Jan. 16, 2012.

* cited by examiner

SOLICITING FIRST PARTY IN COMMUNICATION SESSION TO MAINTAIN CALL WHEN DEGRADATION OF CONNECTION TO SECOND PARTY IS ANTICIPATED

CROSS-REFERENCE TO RELATED APPLICATIONS

The present application is a continuation of U.S. patent application Ser. No. 11/687,139, filed on Mar. 16, 2007, which is expected to issue as U.S. Pat. No. 8,238,899 on Aug. 7, 2012, the contents of which are incorporated herein by reference.

BACKGROUND

In a communication session between a mobile device and another communication device when signal quality from the mobile device degrades or the mobile device moves out of range of a coverage area the communication session is typically dropped. It would be advantageous to not simply drop a degraded or out of range communication session but rather provide a message to the user of the communication device suggesting they wait while an attempt is made to resolve the problem.

Degradation of a communication session may be simply due to the current location of the mobile device and may be resolved quickly as the user of the mobile device moves away from the location causing the problem. In the case of being out of range it may be possible to quickly reestablish the communication session once the user of the mobile device enters a new coverage area. These are of course simplistic examples but serve to illustrate the problem to be solved.

BRIEF DESCRIPTION OF THE DRAWINGS

Embodiments are illustrated by way of example and without limitation in the figures of the accompanying drawings, in which like reference numerals indicate corresponding, analogous or similar elements, and in which.

DETAILED DESCRIPTION

Figure 1:
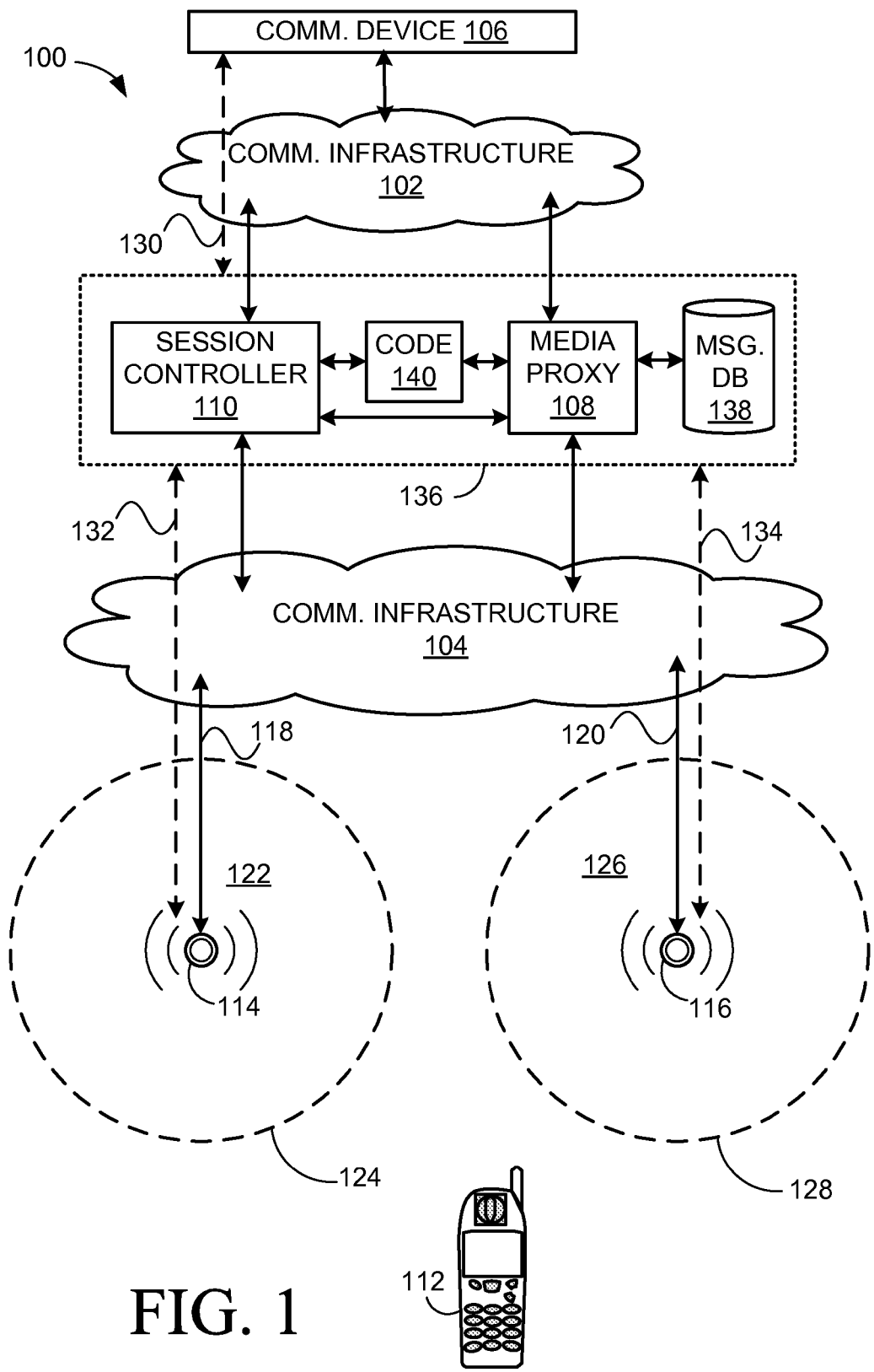
FIG. 1 is an illustration of an exemplary communications system.

In a common communication architecture, two communication devices communicate via an intermediary system that handles both signaling and data transfer. Such a system may include a session controller, responsible for establishing and maintaining communication sessions and a media proxy that stores and forwards information on its way from and to the communication devices. Many session controlling protocols are known, one example of which is SIP (Session Initiation Protocol).

In an exemplary scenario, a first communication device may attempt to establish communication with a second communication device. The first device may exchange signaling with a session controller and will provide it with information about the requested communication session, for example, identification of the second communication device and type of communications. The session controller may locate the other communication device and may exchange signaling with it in order to involve it in the communication session.

Once the second device is committed to the communication session, the session controller may involve a media proxy in the session. It may cause the first device to establish a communication leg with the media proxy and may cause the second device to establish a communication leg with the media proxy. Once the communication legs are established, the two communication devices may be able to exchange information via the media proxy. The information may involve data, media streams of voice and/or video and any other type of information.

While the devices communicate media streams, users of the devices may be actively involved in the communication session, exchanging audio and/or visual messages. If one device becomes unreachable during the session, or if the quality of the media streams exchanged with that device deteriorates too much, it is likely that the user of the other device may terminate the communication session.

With a wireless mobile device, changes in location of the device may cause changes in the communication quality and may cause disconnection of the device from the communication session. Other reasons can also cause those effects.

One exemplary reason for a low quality of media stream may be electromagnetic interference in a particular area. For example, a wireless communication device that communicates over the 2.4 GHz ISM (Industrial Scientific and Medical) band may be affected by other transmissions over that frequency band and by activation of microwave ovens and other devices. The duration of interference may vary.

In another example, a wireless mobile device may be connected to a WLAN (wireless local area network) access point, to a cellular network base station or to any other wireless transceiver. The relative location of the wireless mobile device and the structure of the environment may affect exchange of transmissions between the wireless mobile device and the transceiver and will hence affect the quality of the media streams.

A wireless mobile device that is connected to a specific wireless transceiver may decide to rove to another one. Depending on the technical capabilities of the devices and other criteria, the device may attempt to rove to a transceiver of the same technology or to a different type of transceiver. By rove or roving, we mean the capability to move from one transceiver to another while maintaining the same IP address. An example of other criteria would be the ability of a device to communicate its location or a different phone number when it roves to a new transceiver.

By way of example, a wireless mobile device that is connected to an IEEE 802.11 type WLAN AP (Wireless Local Area Network Access Point) may attempt to rove to another IEEE 802.11 type WLAN AP or, if it has the appropriate communication interface, to a cellular base station. The amount of time that is required to complete roving may depend on many factors, for example, availability of a transceiver to rove to, strength of signals received from such a transceiver and operations involved in the roving process. During that time, quality of communication with the roving device may be low or may not be possible.

A wireless mobile device roving between IEEE 802.11 type WLAN APs that are connected over the same subnet may usually be able to continue using the same IP (Internet Protocol) address. If, however, the wireless mobile device roves between IEEE 802.11 type WLAN APs that are connected over different subnets, it may have to obtain a different IP address at the new subnet, and may not be reachable for a longer time. The time during which a wireless mobile device is unreachable may be even longer if the device performs vertical roving between networks of different types, for example, a cellular network and an IEEE 802.11 type WLAN.

Embodiments of the invention as disclosed address determining when a wireless connection from a first device to a second device appears to be failing or has failed. To illustrate an embodiment of how to deal with this, we refer first to FIG. 1.

FIG. 1 is an illustration of an exemplary communications system 100. Communications system 100 comprises a communication infrastructure 102, a communication infrastructure 104, wireless communication transceivers 114 and 116 and a Ubiquitous Media Manager (UMM) 136. In this embodiment, UMM 136 comprises a session controller 110, a code module 140, a media proxy 108 and a message database 138.

Communication infrastructures 102 and 104 may utilize any of wired, wireless or optical communication networks, either individually or in combination. Communication infrastructures 102 and 104 may comprise private or public networks, or combinations thereof. A non-exhaustive list of examples for such private or public networks includes an Intranet, portions of the Internet, a PSDN (Packet Switched Data Network), a PSTN (Public Switching Telephone Network), a WLAN (Wireless Local Area Network), a PAN (Personal Area Network), and other suitable networks.

Communication device 106 is any type of computing device able to communicate with communication infrastructure 102. Session controller 110 and media proxy 108 are able to communicate with both communication infrastructure 102 and communication infrastructure 104. Wireless communication transceiver 114 is able to communicate with communication infrastructure 104 via communication link 118, and wireless communication transceiver 116 is able to communicate with communication infrastructure 104 via communication link 120.

A coverage area 122 is associated with transceiver 114. Coverage area 122 may have any physical shape. For simplicity, coverage area 122 is shown as having a circular boundary 124 that is centered on transceiver 114. Mobile device 112, if within coverage area 122, will be able to communicate with transceiver 114 using a wireless communication standard.

Similarly, a coverage area 126 is associated with transceiver 116. Coverage area 126 may have any physical shape. For simplicity, coverage area 122 is shown as having a circular boundary 128 that is centered on transceiver 116. Mobile device 112, if within coverage area 126, will be able to communicate with transceiver 116 using a wireless communication standard.

The wireless communication standard with which mobile device 112 communicates with transceiver 114 may, or may not, be the same as the wireless communication standard with which mobile device 112 uses to communicate with transceiver 116.

Examples of standards with which mobile device 112 can communicate with either of transceivers 114 and 116 include; DS-CDMA (Direct Sequence—Code Division Multiple Access), GSM (Global System for Mobile Communications), GPRS (General Packet Radio Service), and other wireless communication protocols that one skilled in the art will recognize as being capable of working with the embodiments described.

Mobile device 112 may be capable of conducting IP (Internet Protocol) communication with other devices via infrastructure 104 and if so will have to acquire an IP address in order to do so. To conduct IP communication via link 118 and transceiver 114, mobile device 112 will have to use an IP address that is appropriate for IP communication via link 118. Similarly, to conduct IP communication via link 120 and transceiver 116, mobile device 112 will have to use an IP address that is appropriate for IP communication via link 120. An IP address that is appropriate for IP communication via link 118 may not be appropriate for IP communication via link 120, and vice versa.

Once mobile device 112 is connected to transceiver 114 and has acquired an appropriate IP address, mobile device 112 and communication device 106 will be able to conduct an IP communication session utilizing the components of UMM 136.

Once mobile device 112 is connected to transceiver 114 and has acquired an appropriate IP address, mobile device 112 communicates a request to session controller 110 to establish a communication session with communication device 106. Session controller 110 then communicates with communication device 106 and with media proxy 108 and establishes a communication leg 130 between communication device 106 and media proxy 108. In addition, session controller 110 communicates with mobile device 112 and with media proxy 108 and establishes a communication leg 132 between mobile device 112 and media proxy 108 by way of transceiver 114. With communication legs 130 and 132 established, communication device 106 and mobile device 112 are able to communicate media content, for example, audio and/or video streams via media proxy For clarity, communication leg 132 is the "first" communication leg, and communication leg 130 is the "second" communication leg.

In another example, communication device 106 communicates a request to session controller 110 to establish a communication session with mobile device 112. Session controller 110 locates mobile device 112 connected to transceiver 114. Session controller 110 communicates with mobile device 112 and with media proxy 108 and establishes a first communication leg 132 between mobile device 112 and media proxy 108 by way of transceiver 114. In addition, session controller 110 communicates with communication device 106 and with media proxy 108 and establishes second communication leg 130 between communication device 106 and media proxy 108.

While mobile device 112 is within coverage area 122, its ability to communicate a media stream at a sufficient quality may be impaired by electromagnetic interference, low reception of signals and other reasons. In addition, if mobile device 112 leaves coverage area 122 it may not be able to communicate with transceiver 114 and therefore may not be able to maintain first communication leg 132. As a result, the user of communication device 106 may notice loss of communication and may possibly terminate second communication leg 130.

To summarize, there are two issues here, the degradation of communication between communication device 106 and mobile device 112 and the moving of mobile device 112 from its current coverage area, resulting in mobile device 112 becoming unreachable.

If mobile device 112 enters coverage area 126 it may be able to acquire a new IP address via transceiver 116. It may then be possible for device 112 and session controller 110 to establish a new first communication leg 134 via transceiver 116 to support a communication session between communication device 106 and mobile device 112.

Figure 2A:
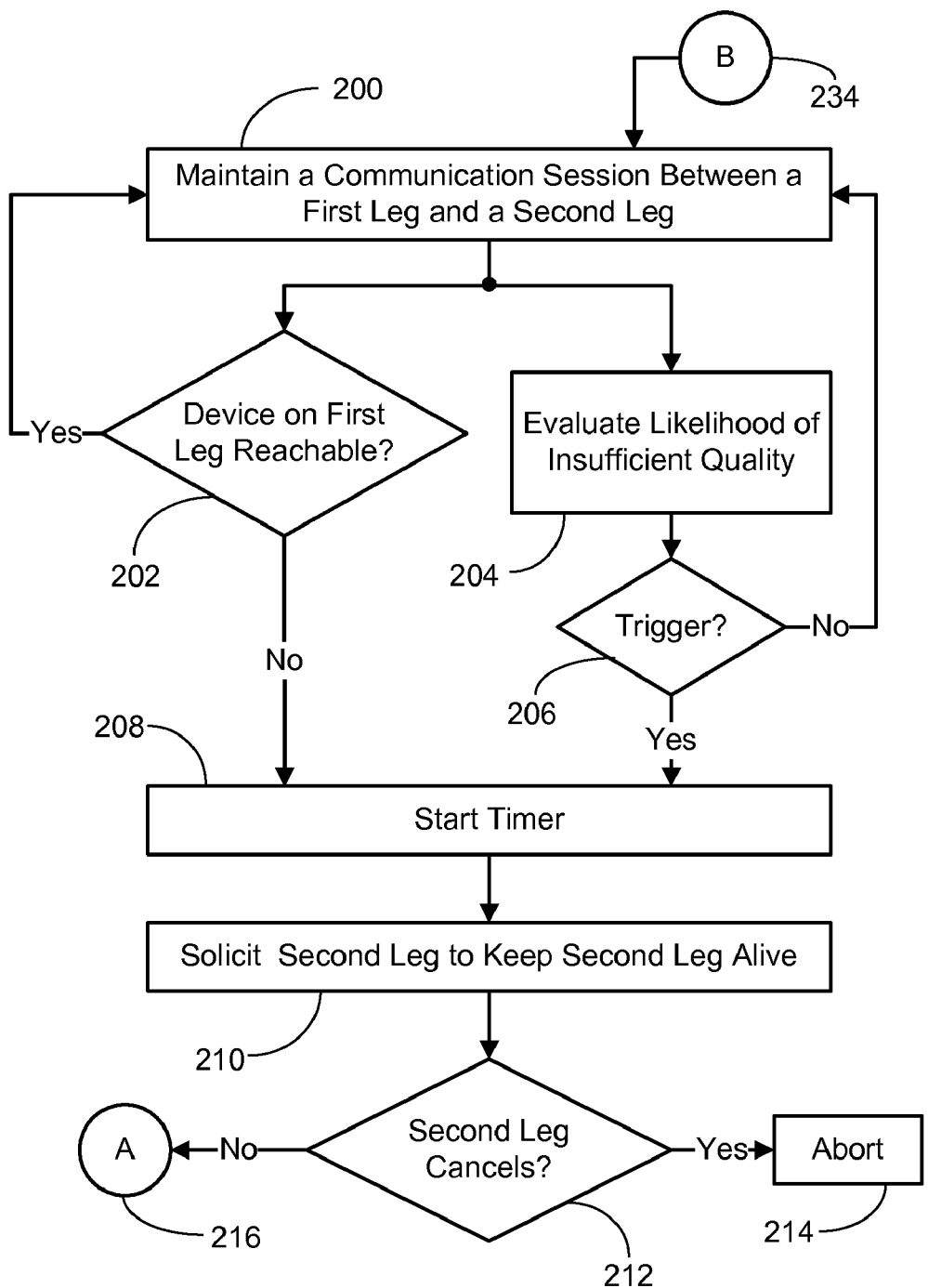
FIGS. 2a, 2b, and 2c are flowcharts of a process for maintaining a communication session.
Figure 2B:
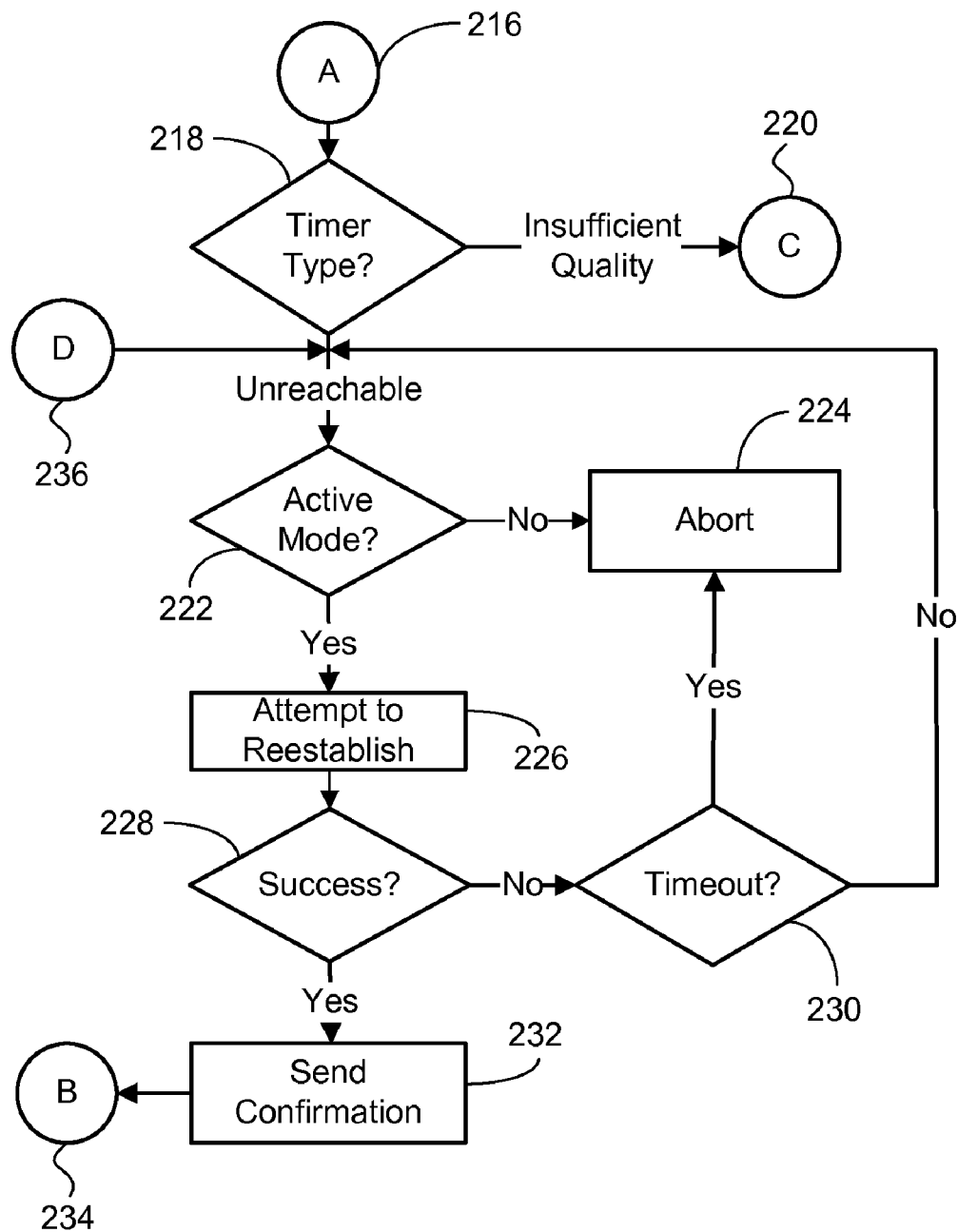
Figure 2C:
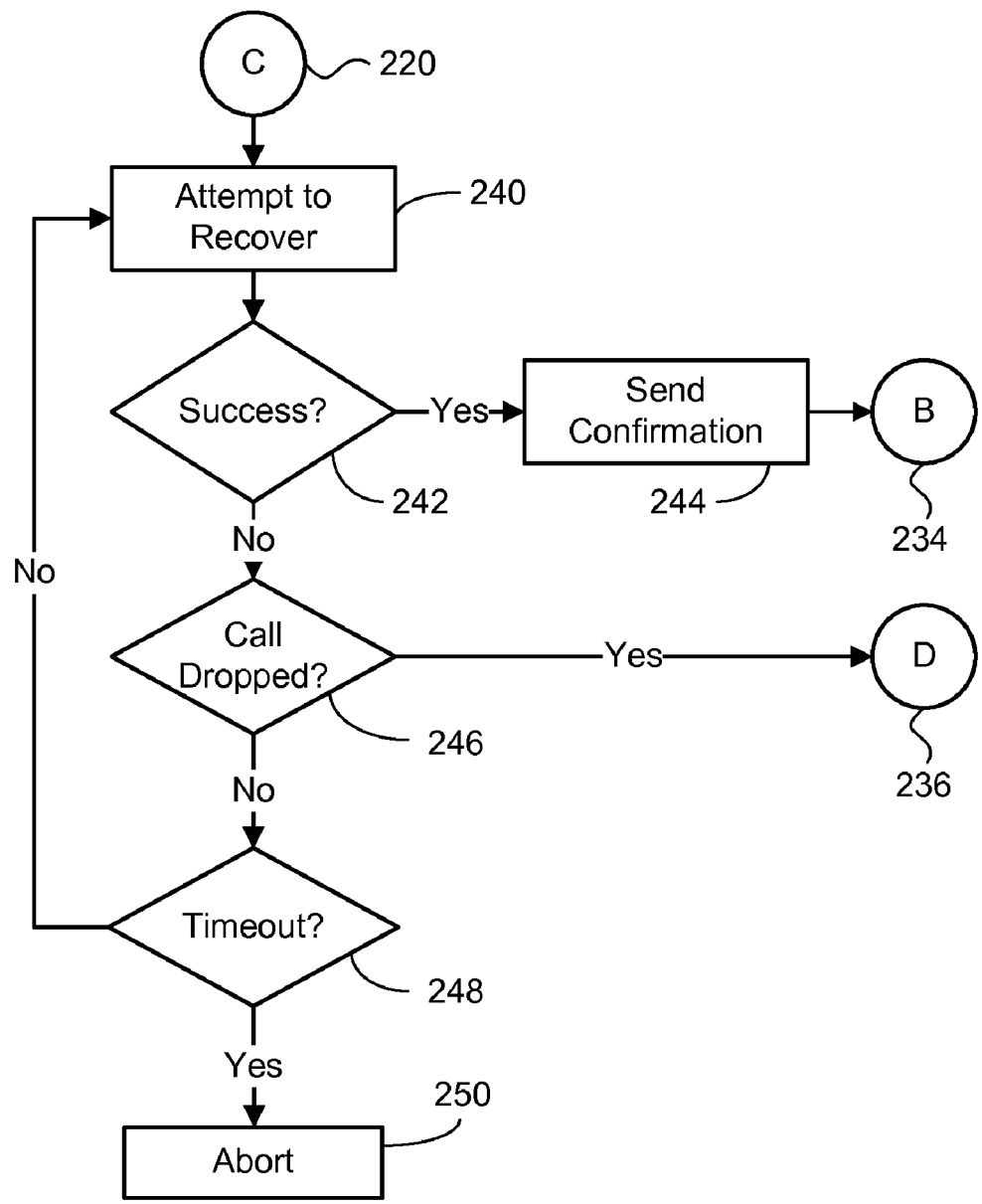

Reference is now made to FIGS. 2a, 2b, and 2c, which are flowcharts of a process for maintaining a communication session. In the exemplary embodiment shown in FIG. 1, code module 140 would be responsible for executing the process illustrated in FIGS. 2a, 2b and 2c.

Referring first to FIG. 2a, at step 200, mobile device 112 is within coverage area 122 and it is involved in a communication session with communication device 106. Mobile device 112 is connected to UMM 136 via first communication leg 132 and communication device 106 is connected to UMM 136 via second communication leg 130. At step 200 two tests are regularly made to determine the status of the communication session. These two tests are indicated by steps 202 and 204. At step 202 a test is made to determine if mobile device 112 is reachable by first communication leg 132. At step 204 a test is made to evaluate the likelihood of insufficient quality of first communication leg 132.

At step 202 if it is determined that mobile device 112 is still reachable via first communication leg 132, then processing returns to step 200. If not processing moves to step 208.

At step 204 an evaluation is made to determine if mobile device 112 is likely to become disconnected. This may be determined, for example, from signaling involving session controller 110 or from analyzing media streams that arrive at media proxy 108 or from indications received from mobile device 112. If, for example, mobile device 112 is about to rove between subnets of the same network or between two networks, it may be concluded that mobile device 112 is likely to become disconnected, at least temporarily. In another example, it may be determined that an IP address used by mobile device 112 is about to expire and that mobile device 112 may not be able to communicate with UMM 136 at least temporarily. In another example, it may be recognized that mobile device 112 is at, or arriving to a geographical location in which it may not be able to communicate with UMM 136. More specifically means for determining if mobile device 112 may become disconnected may include the following:

a) The loss of WLAN coverage in the absence of a cellular connection.
b) As with a) WLAN coverage is available on a different ESS (Extended Service Set). Mobile device 112 will then switch to a new WLAN profile causing an IP address change.
c) Losing WLAN coverage in the presence of cellular, forcing a switch to a different IP address and routing method.
d) A "keep alive" message from session controller 110 to mobile device 112 has gone unanswered, indicating a drop in coverage.
e) Mobile device 112 enters a different regulatory domain and goes quiet until it can detect the new domain. This will most often result in an IP address change.
f) Mobile device 112 has been informed that Radar has been detected. In this case mobile device 112 must switch out of the 5 GHz IEEE 802.11 band to the 2.4 Ghz IEEE 802.11 band or the cellular band to continue the call.
g) The quality metrics (loss rate, jitter) of media stream originating in mobile device 112 and belonging to first communication leg 132 have deteriorated continuously for at least 2 seconds.

At step 204 it may be determined that a quality of communications between mobile device 112 and UMM 136 through first communication leg 132 is likely to drop below a threshold. In one example, UMM 136 through the use of code module 140 may monitor quality of media streams arriving at media proxy 108, such as error rate and/or packet loss. The quality of the media streams may be evaluated against a threshold. UMM 136 may use a fixed or variable threshold. How a threshold is set is described later in this disclosure with reference to FIG. 3.

At step 206 a test is made to determine based upon the information provided by step 204, if mobile device 112 is capable of communications of sufficient quality. If this is the case, processing returns to step 200. If this is not the case processing moves to step 208, where a timer is set. The length of the timer is a pre-determined delay that a user would tolerate before considering dropping the call. The default value may be changed by the user. Step 202 arrives at this same point if mobile device 112 is not reachable by first communication leg 132.

At step 210 a message that is stored in message database 138 is sent to communication device 106 to encourage the user of communication device 106 to maintain the connection, while attempts are made to recover or reestablish the connection. Examples of a message may be an audible message, or a video message in the form of streaming video or an image. An example of an audible message would be "The user at the other end is experiencing a temporary low signal which may improve soon. Please remain on the line." A video message would convey the same information in the form of streaming video or a single image.

At step 212 a test is made to determine if the user of communication device 106 has rejected the attempt to keep the second communication leg 130 alive. If this is the case the communication session is aborted at step 214, if not processing moves to step 218 of FIG. 2b via transfer point 216.

Referring now to FIG. 2b, a test is made at step 218 to check the reason for starting the timer at step 208 of FIG. 2a. If the timer was started because mobile device 112 on first communication leg 132 was unreachable, processing moves to step 222. If the timer was started because the quality of the communication to mobile device 112 over first communication leg 132 was found to be of insufficient quality processing moves to step 240 of FIG. 2c via transfer point 220.

Returning to step 222, a test is made to determine if the communication session established between communication device 106 and mobile device 112 is in active mode. By active mode we mean that the user of the mobile device 112 has indicated to UMM 136 that UMM 136 may redial first communication leg 132 or replace first communication leg 132 with another first communication leg 132 to a pre-specified alternative location where the user can be reached (e.g. desk phone, PC phone). If the session is not in active mode, processing moves to step 224 where the communication session is aborted. If the session is in active mode then an attempt will be made to establish a replacement first communication leg 132 at step 226.

A test is made at step 228 to determine if the attempt of step 226 was successful. If so processing moves to step 232 where an optional confirmation sound or video is sent to communication device 106 indicating the reestablishment of the connection. Processing then returns to step 200 of FIG. 2a via transfer point 234. If at step 228 it was determined that the attempt of step 226 failed, processing moves to step 230 where a test is made to determine if the timer set at step 208 has expired. If the timer has not expired, processing returns to step 222 otherwise the communication session is aborted at step 224.

Referring now to FIG. 2c, at step 240 an attempt to recover communication is attempted. This is done by prompting the user of mobile device 112 for an alternative link. A test is made at step 242 to determine if the user provided an alternative link and if a connection was made. If this is the case processing moves to step 244 where an optional confirmation sound or video is sent to communication device 106 indicating the reestablishment of the connection and then to step 200 of FIG. 2a via transfer point 234.

If the test at step 242 was not successful, processing moves to step 246 to determine if the first communication leg 132 has been dropped. If so, processing moves to step 222 of FIG. 2b via transfer point 236. If not, a test is made at step 248 to determine if the timer set at step 208 has expired. If the timer has not expired, processing returns to step 240, otherwise it moves to step 250 where the communication session is aborted.

Figure 3:
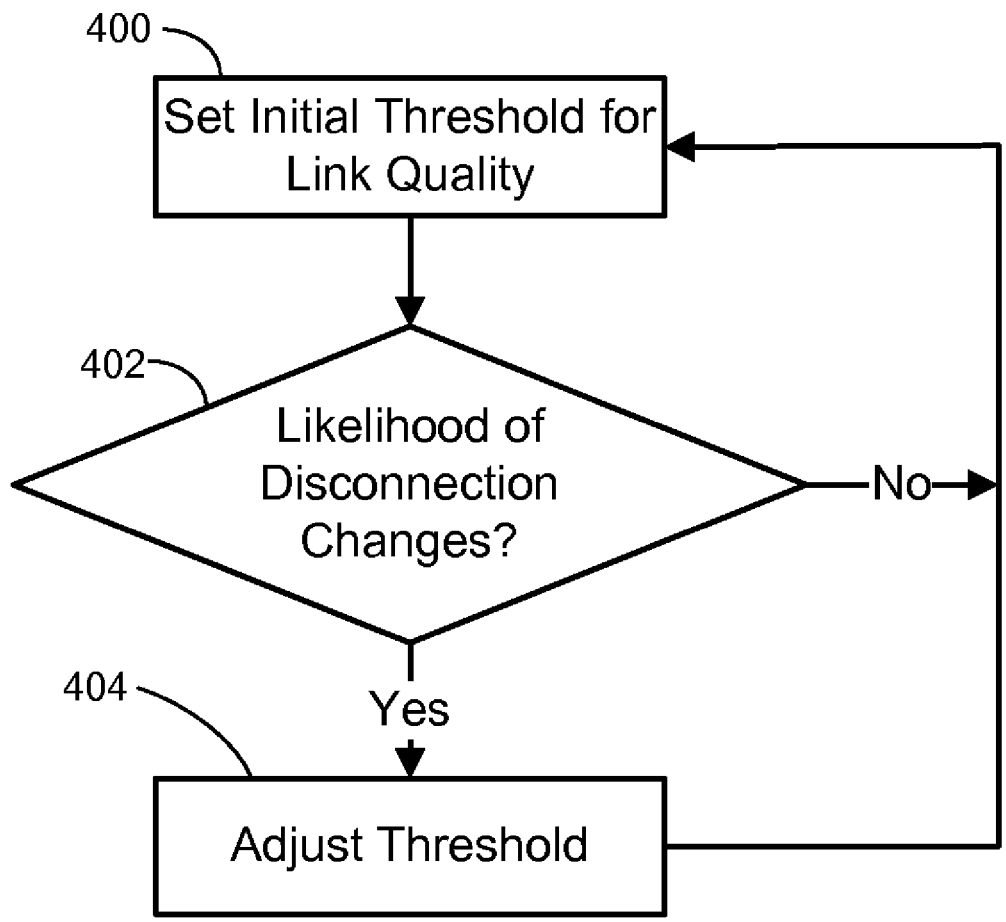
FIG. 3 is a flowchart of a process for setting a threshold on the quality of media streams.

Referring now to FIG. 3 a flowchart of a process for setting a threshold on the quality of media streams is shown. Beginning at step 400, UMM 136 sets an initial threshold. If at step 402 UMM 136 estimates that the likelihood of mobile device 112 disconnecting has changed, at step 404, UMM 136 may adjust the threshold. Otherwise the test at step 402 is repeated. A threshold for a media stream may be defined by numerous metrics, examples being: maximum number of packets lost per second; maximum jitter in seconds; maximum packet delay, in seconds.

Although embodiments of the invention have been described as being implemented in software, one skilled in the art will recognize that embodiments may be implemented in hardware as well. Further, it is the intent of the inventors to include computer readable forms of the invention. Computer readable forms meaning any stored format that may be read by a computing device.

In an alternative embodiment the messages stored in message database 138 may be instead stored on mobile device 112 and thus not require the need for message database 138.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to be performed by a Ubiquitous Media Manager (UMM), the method comprising:
    defining a threshold for quality of communications over a first communication leg 5 of a communication session being handled by the UMM, the first communication leg established between a mobile device and the UMM by way of a wireless communication transceiver that is configured to wirelessly receive media streams from the mobile device and to forward the media streams to the UMM via a communication infrastructure remote to the UMM;
    estimating a likelihood over time of disconnection of the mobile device; and
    responsive to determining that the likelihood over time has changed, adjusting the threshold; and
    measuring quality metrics information over time of a media stream arriving at the UMM from the mobile device over the first communication leg;
    performing an analysis of the media stream by evaluating the quality metrics information against the threshold;
    making a determination from the analysis that the quality of communications between the mobile device and the UMM is likely to drop below the threshold; and
    generating an indication, based on the determination, that the mobile device is about to become incapable of communicating media streams at a sufficient quality;
    wherein the communication session comprises a second communication leg established between the UMM and a communication device, the method further comprising:
    responsive to the indication and prior to the mobile device actually becoming incapable of communicating media streams at a sufficient quality, generating a message that solicits a user of the communication device to maintain the second communication leg of the communication session; and
    transmitting the message to the communication device.

2. The method of claim 1, wherein the threshold is defined by a maximum packet loss rate.

3. The method of claim 1, wherein the threshold is defined by a maximum jitter.

4. The method of claim 1, wherein the threshold is defined by a maximum packet delay.

5. A Ubiquitous Media Manager (UMM) comprising
    a session controller apparatus;
    a media proxy operatively connected to the session controller apparatus; and
    a code module operatively connected to the session controller apparatus and to the media proxy, wherein the code module is configured:
    to define a threshold for quality of communications over a first communication leg of a communication session being handled by the UMM, the first communication leg established between a mobile device and the UMM by way of a wireless communication transceiver that is configured to wirelessly receive media streams from the mobile device and to forward the media streams to the UMM via a communication infrastructure remote to the UMM;
    to estimate a likelihood over time of disconnection of the mobile device; and
    responsive to determining that the likelihood over time has changed, to adjust the threshold; and
    wherein the code module is further configured:
    to measure quality metrics information over time of a media stream arriving at the UMM from the mobile device over the first communication leg;
    to use the media proxy in conjunction with the session controller and the code module to perform an analysis of the media stream by evaluating the measured quality metrics information against the threshold;
    to make a determination from the analysis that the quality of communications between the mobile device and the UMM is likely to drop below the threshold; and
    to generate an indication, based on the determination, that the mobile device is about to become incapable of communicating media streams at a sufficient quality;
    wherein the communication session comprises a second communication leg established between the UMM and a communication device, and wherein the code module is further configured:
    responsive to the indication and prior to the mobile device actually becoming incapable of communicating media streams at a sufficient quality, to generate a message that solicits a user of the communication device to maintain the second communication leg of the communication session; and
    to transmit the message to the communication device.

6. The UMM of claim 5, wherein the threshold is defined by a maximum packet loss rate.

7. The UMM of claim 5, wherein the threshold is defined by a maximum jitter.

8. The UMM of claim 5, wherein the threshold is defined by a maximum packet delay.

9. A non-transient computer readable medium, said medium including computer executable instructions which, when executed on a computing device that comprises a session controller and a media proxy operatively connected to said session controller, cause the computing device:
    to define a threshold for quality for communications over a first communication leg of a communication session being handled by the computing device, the first communication leg established between a mobile device and the computing device by way of a wireless communication transceiver that is configured to wirelessly receive media streams from the mobile device and to forward the media streams to the computing device via a communication infrastructure remote to the computing device;

to estimate a likelihood over time of disconnection of the mobile device; and responsive to determining that the likelihood over time has changed, to adjust the threshold; and wherein the computer executable instructions, when executed on the computing device, cause the computing device:

to measure quality metrics information over time of a media stream arriving at the computing device from the mobile device over the first communication leg;

to use the media proxy in conjunction with the session controller and the code module to perform an analysis of the media stream by evaluating the measured quality metrics information against the threshold;

to make a determination from the analysis that the quality of communications between the mobile device and the computing device is likely to drop below the threshold; and to generate an indication, based on the determination, that the mobile device is about to become incapable of communicating media streams at a sufficient quality;

wherein the communication session comprises a second communication leg established between the computing device and a communication device, and wherein the computer executable instructions, when executed on the computing device, cause the computing device:

responsive to the indication and prior to the mobile device actually becoming incapable of communicating media streams at a sufficient quality, to generate a message that solicits a user of the communication device to maintain the second communication leg of the communication session; and to transmit the message to the communication device.

10. The non-transient computer readable medium of claim 9, wherein the threshold is defined by a maximum packet loss rate.

11. The non-transient computer readable medium of claim 9, wherein the threshold is defined by a maximum jitter.

12. The non-transient computer readable medium of claim 9, wherein the threshold is defined by a maximum packet delay.

\* \* \* \* \*